United States Patent [19]

Smith et al.

[11] Patent Number: 5,298,662
[45] Date of Patent: Mar. 29, 1994

[54] PHENYLENEDIAMINES AS HIGH TEMPERATURE HEAT STABILIZERS

[75] Inventors: Bernard C. Smith, Naugatuck; Mark C. Richardson, Cheshire, both of Conn.

[73] Assignee: Uniroyal Chemical Company, Inc., Middlebury, Conn.

[21] Appl. No.: 539,286

[22] Filed: Jun. 18, 1990

Related U.S. Application Data

[63] Continuation of Ser. No. 164,023, Mar. 4, 1988, abandoned.

[51] Int. Cl.$^5$ .......................... C07C 211/44; C07C 211; C07C 54; C09K 15/18
[52] U.S. Cl. .......................... 564/434; 568/582; 252/401; 252/403; 252/405; 165/104.19
[58] Field of Search .......................... 568/582; 521/128; 252/401, 405, 73, 77, 403; 564/305, 434; 165/104.19

[56] References Cited

U.S. PATENT DOCUMENTS

| 2,734,808 | 2/1956 | Biswell | 564/434 X |
| 3,157,615 | 11/1964 | Stahly et al. | 524/87 |
| 3,542,691 | 11/1970 | Budd et al. | 564/434 X |
| 3,542,692 | 11/1970 | Spacht | 564/434 X |
| 3,637,573 | 1/1972 | Mise et al. | 524/722 |
| 4,146,687 | 3/1979 | Reale | 521/107 |
| 4,617,984 | 10/1986 | Harding et al. | 568/582 |
| 4,794,135 | 12/1988 | Wheeler et al. | 524/100 |

OTHER PUBLICATIONS

Stubbs, "Chemical Abstracts", vol. 67, p. 11119, Section No. 11759d (1967).
The Merck Index, "Tenth Edition", p. 1092, Section No. 7441 (1983).
Synthetic Lubricants, Gunderson & Hart Reinhold Publishing Co. pp. 86-87, (1962).

Primary Examiner—Glennon H. Hollrah
Assistant Examiner—John D. Pak
Attorney, Agent, or Firm—Daniel Reitenbach

[57] ABSTRACT

The invention relates to the high temperature stabilization of polyol heat transfer fluids by the use of N-phenyl-p-phenylenediamines.

2 Claims, No Drawings

PHENYLENEDIAMINES AS HIGH TEMPERATURE HEAT STABILIZERS

This is a continuation of application Ser. No. 164,023 filed on Mar. 4, 1988, now abandoned.

FIELD OF THE INVENTION

This invention relates to stabilized, high temperature coolant fluids. In particular, the invention is directed to polyol heat transfer fluids stabilized against high temperature degradation by the incorporation of certain N-phenyl-p-phenylenediamines.

THE PRIOR ART

High temperature, heat transfer fluids are often utilized in the jackets of processing equipment to effect operational temperature control, especially in jackets surrounding high mechanical energy input environments such as that found in chemical processing pumps and compressor lubricating seals.

Polyols, also known as polyglycols, polyalkylene glycols; polyoxyalkylene glycols; or the corresponding glycerols are essentially linear chain growth polymers which display a number of properties that are highly desirable in heat transfer fluids (see *Synthetic Lubricants, Polyglycols*, Gunderson, Hart and Millett). These include excellent lubricity, high flash point and viscosity index, low volatility and pour point, little effect on rubbers and metals, good thermal stability, essentially constant thermal conductivity over a broad temperature range, and non-gumming and sludging characteristics.

In general, a polyol is the polymeric reaction product of an organic oxide and a compound containing two or more active hydrogens. Dihydroxy polyols, or diols, are produced when one or more of the oxides are polymerized onto an initiator which has two active hydrogens. If a tri-functional initiator such as glycerine is used, the addition of oxide produces a linear chain growth in three directions and a tri-hydroxyl polyol, or triol, is the result.

Uninhibited polyols are generally not stable to oxidation, especially at elevated temperatures of up to about 180° C. Over the years, many inhibitors have been discovered which successfully retard the oxidative degradation of the polyols. These include numerous amines, e.g., triethanol amine; benzylquinolines; phenothiazine; and certain phenylenediamines, e.g., N,N'-di-(2-naphthyl)-p-phenylenediamine. However, present chemical knowledge is insufficient to predict the most effective antioxidant for a given system from chemical structure considerations, and laboratory degradation tests simulating service conditions are still necessary to screen antioxidants for acceptable end-use performance.

There is a constant demand for improved antioxidant performance from polyol heat transfer fluid compositions, especially in the more severe temperature ranges above 150° C.; that is, in the range of from about 180° C. to 220° C.

Accordingly, it is an object of this invention to provide polyol compositions which are stabilized against oxidative degradation at temperatures above 150° C., specifically in the range of from about 180° C. to 220° C. and the use of these stabilized compositions as heat transfer fluids.

DESCRIPTION OF THE INVENTION

In one aspect, this invention is directed to high temperature stabilized heat transfer fluids consisting essentially of:
i) at least one polyol; and
ii) a stabilizer composition comprising a compound having the formula:

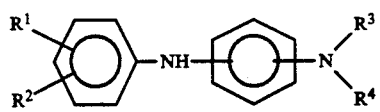

wherein
$R^1$ and $R^2$ are each independently hydrogen or $C_1$–$C_6$ alkyl; and
$R^3$ and $R^4$ are each independently selected from the group consisting of hydrogen, $C_1$–$C_{12}$ alkyl, $C_3$–$C_{12}$ cycloalkyl, $C_7$–$C_{11}$ arylalkyl and $C_7$–$C_{16}$ alkaryl. The alkyl groups may be linear or branched.

The preferred phenylenediamine compounds are those wherein the amine groups are in the para position. Particularly preferred compounds are para-phenylenediamines wherein $R^1$, $R^2$ and $R^3$ are hydrogen, and $R^4$ is $C_3$–$C_8$ alkyl.

Illustrative of the preferred phenylenediamine compounds which may be employed include N-isopropyl-N'-phenyl-p-phenylenediamine, N-(1,4-dimethylpentyl)-N'-phenyl-p-phenylenediamine and N-phenyl-N'-(1,3-dimethylbutyl)-p-phenylenediamine. Moreover, mixtures of the phenylenediamine compounds may also be employed.

The polyol heat transfer fluid compositions of this invention comprise an effective amount of the aforedescribed phenylenediamines. As employed herein, the term "effective amount" refers to that amount of phenylenediamine which is needed to prevent significant degradation of the polyol at elevated temperatures, i.e., above 150° C. Although the amount of phenylenediamine will vary somewhat (based upon such factors as the particular polyol being stabilized and/or the particular phenylenediamine being employed) such an effective amount may be readily determined by routine experimentation. In general, such an effective amount will be between 0.1 and 3 weight percent, preferably between 0.25 and 2.0 weight percent and most preferably between 0.5 and 1 weight percent based on the weight of the polyol. In view of the above, an important parameter vis-a-vis the efficacy of a given antioxidant is its solubility in the polyol. For example, di-naphthyl substituted-para-phenylenedia-mines are so insoluble in the liquid polyols at room temperature that sufficient levels of degradation protection are not obtainable.

The phenylenediamine of this invention will provide stability against degradation of the polyols at temperatures between about 150° C. and 220° C. for periods of time well in excess of that typically achieved by other antioxidants at these elevated temperatures.

The polyols that can be effectively stabilized by the phenylenediamines of this invention are those that are useful in a heat transfer medium composition and the preparations of same are well documented in the art.

Illustrative of the polyols of this invention are the polyoxypropylene and polyoxyethylene diols and triols; the monoether and diether polyglycols and mixtures thereof including those prepared by using glycerol, trimethylol propane and hexane triol as starters. Illustrative of the oxides that can be used to prepare the polyols are ethylene oxide, propylene oxide, 1,2-butylene oxide and epichlorohydrin. The preferred are those polyether polytriols based on propylene oxide.

The polyols of this invention have average molecular weights of from 200 to 5,500, preferably from 250 to 4,500 and more preferably from 500 to 3000.

As a class, phenylenediamines have been known to function as antioxidants for natural and synthetic elastomers (see e.g., U.S. Pat. No. 3,138,571, Belgium Patent No. 778,579, U.S. Pat. No. 3,157,615 and Japanese Patent No. 60,221,451); as stabilizers in combination with alkali metal compounds in various polyesters (e.g., see Great Britain Patent No. 1,403,565 and 1,180,386) and nylons (e.g., see W. German Patent No. 1,669,004 and U.K. Patent No. 1,530,257) and alone and in combination with other additives as antioxidants and scorch inhibitors in solid polyurethanes, polyurethane sealants and polyurethane foams (e.g., see U.S. Pat. Nos. 3,637,573, 4,544,680, 4,547,528 and 4,360,621). Additionally, phenylenediamines have had certain esoteric room temperature uses as, for instance, an additive in hair dye solutions some of which also contain additive amounts of polypropylene glycol (e.g., see Japanese Kokai 61/130209, 60/4115 and 53/104738).

With regard to phenylenediamine use in polyurethane foam, flexible polyurethane foam is usually made by rapidly mixing together a polyether polyol of the triol-type, a diisocyanate, water, sometimes an auxiliary blowing agent, at least two catalysts and a surfactant that acts as a cell-control agent. The two principle reactions occur nearly simultaneously. In one, the polyether polyol couples with the diisocyanate to produce a (polyether) polyurethane chain extension and eventually a three-dimensional network or gel structure. In the other, water reacts with isocyanate groups to produce a carboxamic acid function which decarboxylates to give carbon dioxide and an amine group. Amines can also be present during the formation of polyurethane foams as a result of the use of, for example, tertiary amines as catalysts for the isocyanate reaction or the use of amine-started polyols. Also, the preparation of the flexible polyurethane foams is a highly exothermic process and temperatures in the central portion of the bun are often in the range of from about 100° C. to about 165° C. Furthermore, antioxidants are usually used in synergistic combination in the foams at from about 500 ppm to 5000 ppm. Typical of the polyurethane antioxidant combination disclosures is that of U.S. Pat. No. 4,146,687 (issued 27 March, 1979) wherein phenothiazine and amine antioxidant synergistic mixtures are taught to be useful in obviating scorching (color) during flame retarded polyurethane foam production. It was theorized in this patent that the "phenothiazine acts as an acid acceptor and the amine antioxidants prevent oxidation of the amines" (col. 1, lines 48-50).

Highly desireable characteristics of the stabilizers of this invention are that they are liquid at or about ambient temperature and selection of the proper optimum solubility match between a given liquid polyol and one or more of the liquid N-phenyl-p-phenylenediamines of this invention is readily determinable by routine experimentation.

EXAMPLES

The following examples are intended to further illustrate the present invention and are not intended to limit the scope of the invention whatsoever.

EXAMPLES 1-4

The following examples illustrate the superior polyol heat transfer fluid stability realized via the use of the N-phenyl-p-phenylenediamines of this invention under extremely high temperatures as compared to commercially available diphenylamines and phenylenediamine antioxidants.

The heat transfer fluid used in these examples is a polyether polyol sold by the Dow Chemical Company under the trademark "POLYGLYCOL P-2000". The stabilizers were added to the polyol at two weight levels: 0.25 weight percent and 0.5 weight percent; both based on the weight of the glycol or as indicated.

The Thermogravimetric Analysis (TGA) was performed as follows: the TGA pan was filled with the stabilized glycol (about 20-30 mg) and, with an air circulation of about 50 cc per minute, the temperature was quickly raised to 220° C.

The TGA end-point, recorded in minutes, was taken at the initial on-set of weight loss.

TABLE I

| | STABILIZER | WEIGHT % | TGA (MIN.) |
|---|---|---|---|
| Example 1 | A | 0.25 | 4.4 |
| | | 0.50 | 15.3 |
| Example 2 | B | 0.25 | 8.7 |
| | | 0.5 | 12.0 |
| Example 3 | C | 0.5 | 26.0 |
| Example 4 | D | 0.5 | 23.0 |
| Comparative 1 | E | 0.25 | 6 |
| | | 0.50 | 8 |
| Comparative 2 | F | 0.25 | 2.2 |
| | | 0.50 | 3.0 |
| Comparative 3 | G | 0.25 | 3.9 |
| | | 0.50 | 4.3 |
| Comparative 4 | H | 0.25 | 2.8 |
| | | 0.50 | 3.4 |

STABILIZERS
A: N-(1,4-dimethylpentyl)-N'-phenyl-p-phenylene-diamine
B: N-isopropyl-N'-phenyl-p-phenylenediamine
C: N-(1,3-dimethylbutyl)-N'-phenyl-p-phenylenediamine
D: One part stabilizer A/two parts stabilizer B
E: N,N'-bis(1,4-dimethylpentyl)-p-phenylenediamine
F: p,p'-bis(phenylisopropyl)-diphenylamine
G: Stabilizer F/phenothiazine - 0.20/0.05 and 0.45/0.05 parts by weight glycol
H: Stabilizer F/stabilizer E - 0.20/0.05 and 0.45/0.05 parts by weight glycol.

We claim:
1. A method of stabilizing a polyol fluid against degradation between about 180° C. and 220° C. comprising adding to said fluid a stabilizing effective amount of a stabilizer composition comprising a compound having the formula

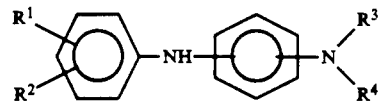

wherein $R^1$, $R^2$ and $R^3$ are hydrogen, and $R^4$ is $C_{3-8}$ alkyl.

2. The method of claim 1 wherein said compound is selected from the group consisting of
   i) N-(1,4-dimethylpentyl)-N'-phenyl-p-phenylenediamine;
   ii) N-isopropyl-N'-phenyl-p-phenylenediamine;
   iii) N-(1,3-dimethylbutyl)-N'-phenyl-p-phenylenediamine; and
   iv) mixtures thereof.

* * * * *